United States Patent [19]

Wills

[11] Patent Number: 4,838,782
[45] Date of Patent: Jun. 13, 1989

[54] BURNER WITH REGENERATIVE BED

[76] Inventor: Brian Wills, "Sandbourne", Stoney Lane, Kniver, West Midlands, United Kingdom

[21] Appl. No.: 82,850
[22] Filed: Aug. 6, 1987
[51] Int. Cl.[4] .............................................. F23D 11/44
[52] U.S. Cl. ........................................ 431/166; 431/7; 431/11; 431/207; 431/167; 432/181; 432/182
[58] Field of Search ................... 431/7, 11, 170, 166, 431/167, 207, 215, 217, 240; 165/9.3; 432/180, 182, 181, 54; 126/91 A

[56] References Cited

U.S. PATENT DOCUMENTS

| | | | |
|---|---|---|---|
| 1,158,652 | 11/1915 | Doyle | 431/170 |
| 2,399,609 | 4/1946 | Waimer | 432/209 |
| 2,480,255 | 8/1949 | Mortson et al. | 431/167 X |
| 3,468,616 | 9/1969 | Ward | 431/166 |
| 3,834,864 | 9/1974 | Jakobi et al. | 432/181 X |
| 4,295,821 | 10/1981 | Schilling | 431/170 X |
| 4,355,973 | 10/1982 | Bailey | 126/91 A X |
| 4,378,045 | 3/1983 | Balke et al. | 165/9.3 |
| 4,604,051 | 8/1986 | Davies et al. | 431/170 X |
| 4,657,504 | 4/1987 | Akiyama et al. | 431/166 |
| 4,671,345 | 6/1987 | Masters et al. | 432/182 X |

FOREIGN PATENT DOCUMENTS 2128724  11/1985  United Kingdom .

Primary Examiner—Samuel Scott
Assistant Examiner—Carl D. Price
Attorney, Agent, or Firm—Fulwider, Patton, Rieber, Lee & Utecht

[57] ABSTRACT

A regenerative burner includes a chamber containing heat storage bodies which extract heat from hot products of combustion flowing through the burner during one part of a cycle of operation and yield up that heat to incoming air during a further part of the cycle.

16 Claims, 3 Drawing Sheets

BURNER WITH REGENERATIVE BED

BACKGROUND OF THE INVENTION

The present invention relates to a burner operable in fire and flue modes and to a method of supplying heat to a chamber wherein first and second burners are arranged to direct hot products of combustion into the chamber, fuel is supplied to said burners alternately, during the supply of fuel to the first of said burners, air is supplied through the first burner, hot products of combustion pass from the chamber into the second burner, heat is extracted from products of combustion which have left the chamber and is stored in heat storage means and wherein, during the supply of fuel to the second burner, air is passed through the heat storage means associated with that burner to receive heat therefrom, the heated air being mixed with fuel by the second burner and hot products of combustion passing from the chamber through the first burner and heat being extracted from the products of combustion by heat storage means associated with the first burner. The chamber may contain workpieces which are to be heated. The workpieces may be moved continuously or intermittently through the chamber. Alternatively, the workpieces may be heated in a batch process. Alternatively, a fluid which is to be heated may be directed through ducts which extend through or are incorporated into the walls of the chamber. In a further alternative, heat may be transferred through the walls of the chamber from the products of combustion to material which is to be heated.

In U.S. Pat. No. 4,604,051 issued Aug. 5, 1986 to Davies et al there is disclosed a burner operable in fire and flue modes and in which there is incorporated heat storage means for storing heat extracted from products of combustion during the flue mode and imparting that heat to combustion air during operation in the fire mode.

The burner disclosed by Davies et al has a tubular structure extending along and defining an axis of the burner. In the tubular structure, there is defined a fuel-supply duct for supplying fuel to a nozzle at one end of the tubular structure. The heat store is in the form of a conical bed which surrounds and is spaced from the burner axis. The bed is confined between radially inner and outer perforated walls, both of which are conical in shape and which diverge from the burner axis in a direction towards the nozzle. A conical space between a radially outer, impermeable wall of the tubular structure and the radially inner, permeable wall of the bed receives products of combustion which enter the burner in the flue mode. These products of combustion flow in a generally radially outward direction through the bed and then along an outer, conical chamber towards an outlet from the burner.

Davies et al teach the provision of a bed which is composed of fairly small particles. Small particles have a high surface area relative to volume and therefore provide good heat exchange with the flue gases and with the combustion air. However, a bed composed of small particles provides a relatively high resistance to the flow of gases through the bed, as compared with a heat store defining relatively large passages for the flow of gases. In order to avoid an excessively large pressure drop through the bed, the bed proposed by Davies et al is thin, as measured in the radial direction, so that the path followed by gases through the bed is short. In consequence of this, the cycle time must be short and a cycle time of 15 seconds is taught in the Davies et al patent.

At the end of each half cycle, there must be a delay between the interruption of the supply of fuel to one burner and the resumption of the supply of fuel to the other burner. Typically, the duration of this delay must be several seconds. With a cycle time of 15 seconds, this represents a substantial proportion of each cycle so that the heat output from the burners is substantially less than would be the case if one or other of the burners was firing throughout the entire cycle.

In U.S. Pat. No. 4,355,973 issued to John M. Bailey on Oct. 26, 1982, there is disclosed a regenerative burner for firing into a radiant heating tube. A cylindrical regenerator body is fitted into a cylindrical end portion of the tube. In an alternative arrangement disclosed by Bailey, several annular regenerator elements are arranged in a single row along the end portion of the tube with a fuel pipe extending through the centre of each element. In each of these cases, the outside diameter of the regenerator body or elements corresponds to the internal diameter of the tube, so that the regenerator body and elements are supported by their respective tubes.

A similar form of regenerator body is disclosed in U.K. patent No. 2,128,724 granted Nov. 13, 1985 to British Gas Corporation. The regenerator body disclosed in this patent is a monolithic refractory block through which a multiplicity of axial channels extend.

U.S. Pat. No. 2,399,609 issued to E. Wainer on Apr. 30, 1946 also discloses a pair of regenerators associated with a radiant tube. In this case, the tube is vertical and one regenerator is arranged vertically below a lower end of the tube. The other regenerator is arranged horizontally and communicates with the upper end of the tube through a duct which defines a right angle bend. Fuel is injected laterally into respective chambers communicating at one of their ends with the interior of the radiant tube and at their other ends with the respective regenerator.

SUMMARY OF THE INVENTION

According to a first aspect of the present invention, there is provided a burner which is operable in fire and flue modes and which comprises a housing defining an opening which is an air inlet opening when the burner is operating in the fire mode, an inner tubular structure extending along the interior of the housing and defining a fuel supply duct for supplying a fluent fuel to a mixing position adjacent to a downstream end of the fuel supply duct, a gas permeable, annular regenerative bed disposed in the housing in communication with said inlet opening and surrounding said tubular structure, means defining a first end of the bed remote from the mixing position and means defining a second end of the bed nearer to the mixing position, wherein said tubular structure includes an impermeable radially outer wall, the bed rests on said wall throughout substantially the entire length of the bed from the first thereof to the second end and wherein said means defining the second end of the bed is a gas permeable bed retaining means disposed between the bed and the mixing position to enable flow of products of combustion into the bed generally in a direction extending along said wall during operation of the burner in the flue mode and to enable combustion air to flow from the bed generally in the opposite direction longitudinally of said wall to the mixing position during operation of the burner in the fire mode.

Flow of products of combustion into the bed along a path extending longitudinally of the impermeable outer wall of the central tubular structure enables the path of the gases within the bed to be long, as compared with the path of the gases through the bed disclosed by Davies et al. This enables a much longer cycle time to be used and assists with distribution of the gas flow evenly throughout the bed.

In a burner in accordance with the first aspect of the invention, the bed is partly supported by the impermeable outer wall of the central tubular structure. This wall can conveniently be constructed to have high strength. For example, the wall may be metallic, in a case where the wall will be subjected to temperatures not significantly above 1000° C. Alternatively, in cases where the wall is to be subjected to much higher temperatures, the wall can be formed of ceramic materials and can have whatever thickness is necessary to provide the desired strength. In the burner disclosed in the Davies et al specification, the wall at the inner periphery of the bed is a permeable wall, must be capable of retaining small particles of bed material and must cause only a very small pressure drop in the gases flowing through the wall. Since the combustion gases flow through the wall, the wall will inevitably be subjected to high temperatures so that metallic materials will generally be unsuitable for construction of the wall. A wall of ceramic material which is capable of retaining small particles of bed material and yet provides only a low pressure drop must be very thin and therefore fragile.

According to a second aspect of the invention, there is provided a burner operable in fire and flue modes and comprising a housing defining an opening which is an air inlet opening when the burner is operating in the fire mode, a tubular structure extending along the interior of the housing and defining a fuel supply duct for supplying a fluent fuel to a mixing position adjacent to a downstream end of the fuel supply duct, a gas permeable, annular regenerative bed disposed in the housing in communication with said inlet opening and surrounding said tubular structure, means defining a first end of the bed remote from the mixing position, means defining an air flow path from said inlet opening via the bed to the mixing position and a flame stabilizer disposed at the mixing position for causing turbulent flow of the air and fuel at the mixing position, wherein the flame stabilizer defines a second end of the bed remote from the mixing position, the bed being excluded from the mixing position by the flame stabilizer.

There is also provided in accordance with the invention a method of supplying heat to a chamber using first and second burners operated alternately in fire and flue modes, wherein a substantial proportion of the heat carried by products of combustion leaving the chamber are stored in an annular bed surrounding and spaced radially from an axis of the burner which is operating in the flue mode, wherein the products of combustion enter the bed along a path which is substantially parallel to the burner axis and travel in a generally axial direction within the bed and wherein the axial flow of the products of combustion into the bed is continued for thirty seconds or more.

In a method in accordance with the present invention there is preferably stored in the burner at least one tenth of the total heat extracted from the products of combustion after those products have left the chamber and the proportion of that heat which is stored in the burner is more preferably in excess of one fifth. A complimentary proportion of the heat extracted from the products of combustion after those products have left the chamber may be stored in heat storage means outside the burner concerned. Alternatively, substantially all of the heat extracted from the products of combustion after those products have left the chamber may be stored in the burner. In the latter case, the provision of separate heat storage means is avoided. However, in a case where separate heat storage means is provided, the present invention still provides the advantage that the temperature of the products of combustion leaving the burner is substantially lower than the temperature at which the products of combustion leave the chamber. Accordingly, a lower rate of heat loss is attainable without excessive expense or inconvenience and the bulk of the heat storage means outside the burner can be less.

By a bed, I mean a collection of distinct elements, each of which is small, as compared with the size of the bed. In U.K. patent No. 2,128,724, the term "bed" is used in an unusual way to designate a monolithic refractory block. In the present specification, including the claims, I use the designation "bed" to distinguish from a monolithic refractory block and from a row of annular elements, each of which has the same diameter as does the regenerator, considered as a whole.

BRIEF DESCRIPTION OF THE DRAWINGS

An example of a furnace which is used in a method in accordance with the invention and which includes two burners embodying the invention will now be described, with reference to the accompanying drawings, wherein.

DETAILED DESCRIPTION OF THE PREFERRED EMBODIMENT

Figure 1:
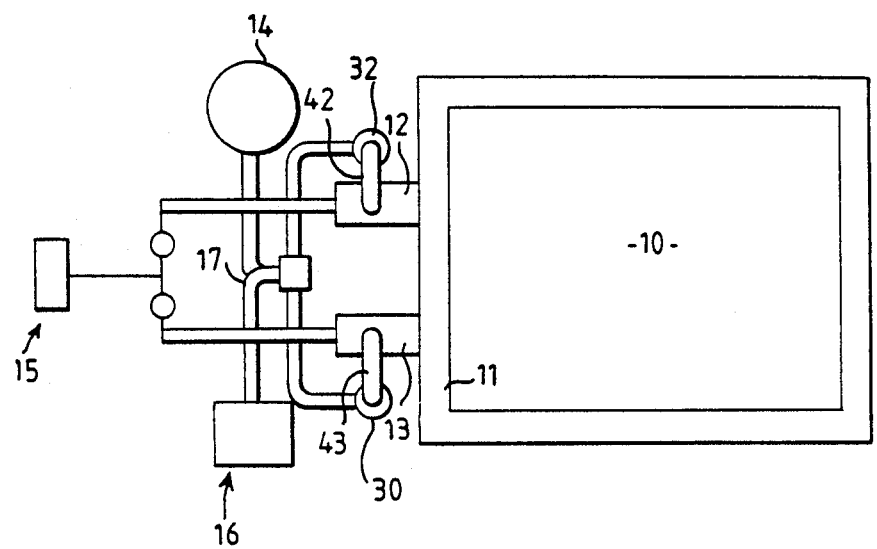
FIG. 1 shows a diagrammatic representation of the furnace, burners and associated equipment.

The furnace includes walls defining a chamber 10 within which workpieces or materials are to be heated. The furnace includes an entrance and means may be provided for introducing workpieces or materials into the chamber 10 and transferring workpieces or materials out of the chamber 10. However, as these details form no part of the present invention, they are not represented in the drawing. One of the walls, 11, defines two openings and there are mounted on the wall 11, partly lying outside the furnace, respective burners 12 and 13 which communicate with the chamber 10 through these openings. The burners are operated alternately in a cyclical manner. During a first half of each cycle, fuel and air are supplied separately to the burner 12, are mixed by the burner and burn as they are discharged from the burner through the opening in the wall 11 into the chamber 10. Hot products of combustion pass from the chamber 10 through the burner 13 and associated heat storage means 30 to a flue 14. Heat is extracted from the products of combustion and stored in the burner 13 and the heat storage means 30 so that the products of combustion discharged to the flue are cool, relative to the products of combustion in the chamber 10 during steady-state operation. Typically, the temperature of the gases in the chamber 10 may be within the range 800° to 1400° C.; whereas the temperature of the gases leaving the burner 13 may be in the range 500° to 700° C. and the temperature of the gases leaving the heat storage means 30 may be in the range 100° to 200° C. During the second half of the cycle, air and fuel are supplied separately to the burner 13. The air is heated in the heat storage means and in the burner from ambient temperature to a temperature which is typically within the range 700° to 1200° C., before being mixed in the burner 13 with the fuel. The fuel and hot air burn as they pass from the burner into the chamber 10 and the hot products of combustion are withdrawn from the chamber through the burner 12. During the second half of the cycle, the burner 12 and heat storage means 31 associated therewith extract heat from the products of combustion, before these are discharged to the flue 14.

For supplying fuel to the burners alternately, there is provided fuel supply means indicated by the reference number 15. The fuel is typically natural gas and the supply means 15 may include a gas main and valves for controlling the flow of gas from the main to each of the burners.

For supplying air alternately to the burners, there is provided air supply means identified by the reference numeral 16. The air supply means includes a fan and one or more valves associated with the burners 12 and 13 for directing air from the fan to one of the burners and directing products of combustion from the other of the burners to the flue 14. A further fan (not shown) may be provided upstream of the flue 14.

Figure 2:
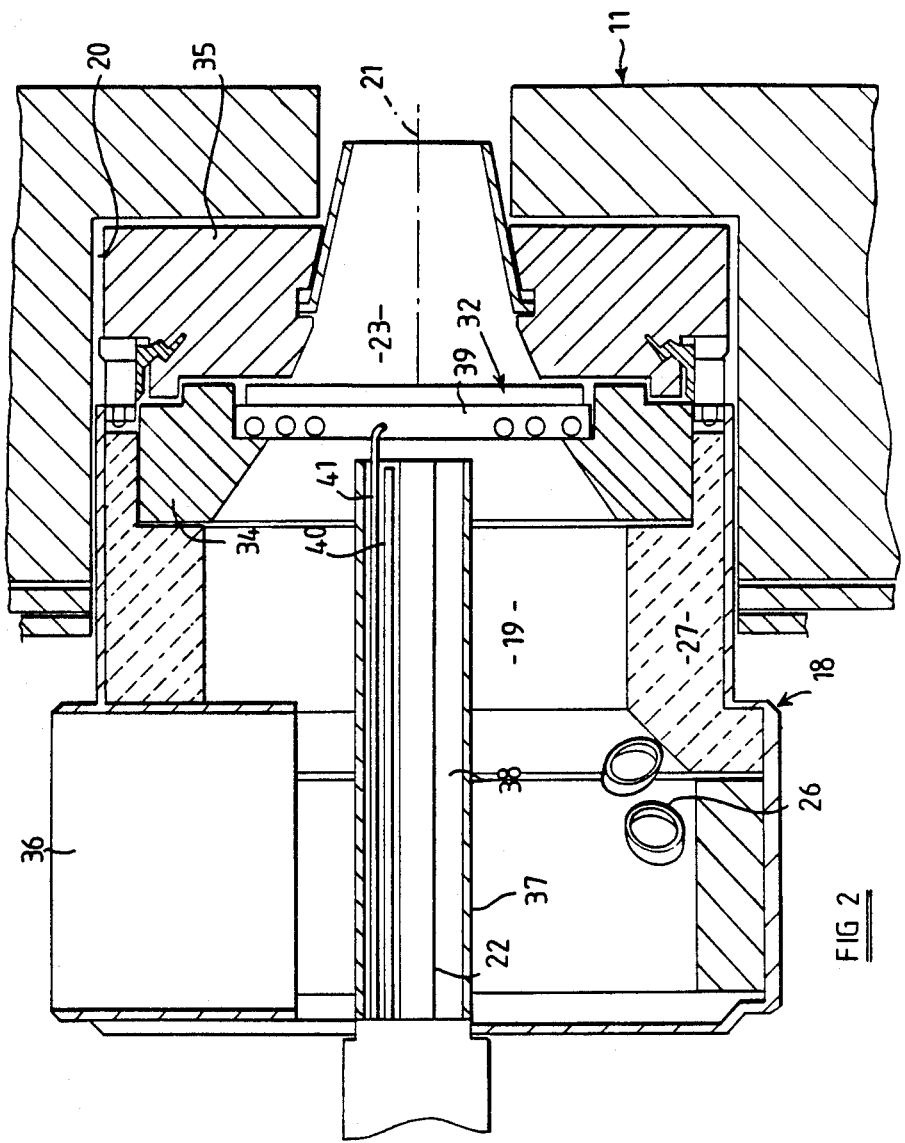
FIG. 2 shows diagrammatically a cross-section through one of the burners and an adjacent part of the furnace.

The structure of the burner 12 is illustrated in more detail in FIG. 2. The burner includes a housing 18 which is disposed partly within and partly outside the furnace wall 11 and which is attached to that wall. Within the housing 18, there is defined an annular chamber 19 which is in co-axial relation with a circular opening 20 defined by the wall 11. The axis of the chamber 19 is represented at 21 in FIG. 2 and is typically perpendicular to the external surface of the wall 11.

At the centre of the annular chamber 19, there is fuel pipe 22 defining a fuel-flow path from the fuel supply means 15 to a mixing position 23 which lies outside the pipe 22, beyond the free-end thereof.

Figure 3:
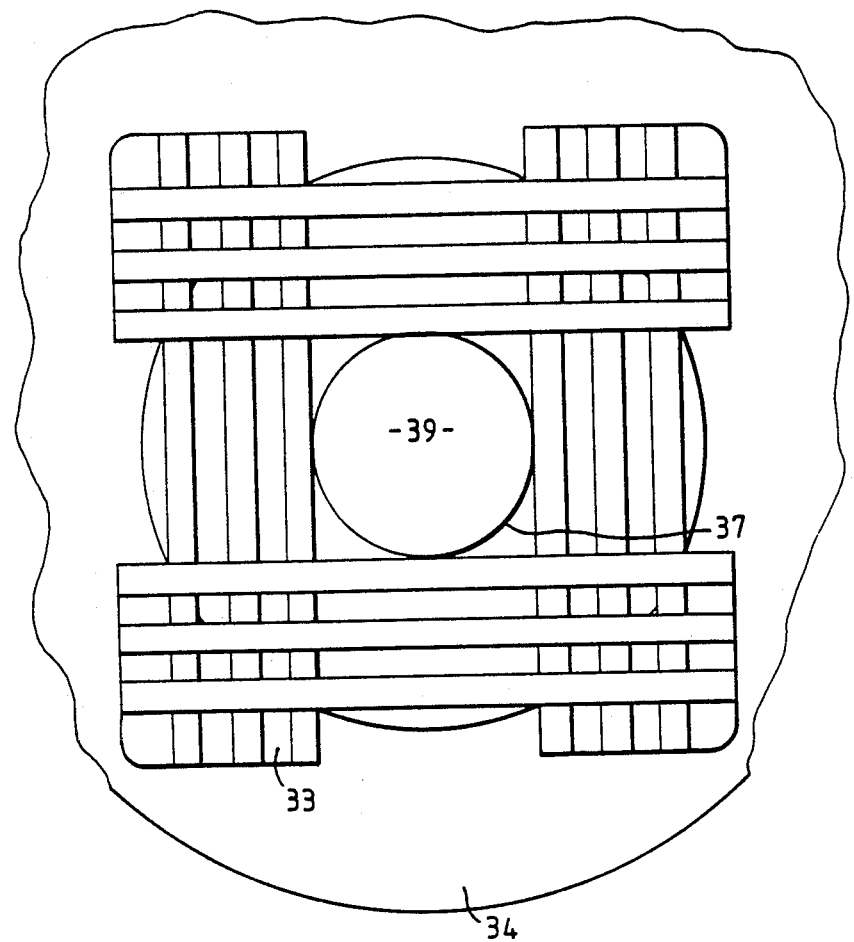
FIG. 3 shows certain details of the burner of FIG. 2.

At the end of the chamber 19 which is adjacent to the free-end of the pipe 22, the chamber is separated from the mixing position 23 by an array 32 of bars which collectively form a permeable wall defining one end of the chamber. The array comprises two layers of bars, the bars of a first of the layers being parallel to one another and the bars of the second layer being parallel to one another and perpendicular to the bars of the first layer. All of the bars are perpendicular to the axis 21. As shown in FIG. 3, there are defined between the bars gaps 33 through which gases can flow without significant resistance. Opposite end portions of each bar are seated in an annular recess defined by an annular block 34 at the periphery of the chamber 19. Spacers are interposed between the corresponding end portions of mutually adjacent bars to maintain the gaps 33 and the assembly of bars and spacers is held in the recess of the block 34 by a gasket and a further block 35. The bars of the array 32 may be solid rods or hollow tubes and are preferably formed of a ceramic material. It will be understood that other forms of permeable wall structure, for example, a ceramic block defining interstices through which gases can flow, may be substituted for the array 32.

The chamber 19 contains a permeable heat storage bed comprising a number of heat storage bodies 26 which are initially separate from one another but are packed into the chamber 19 to occupy that chamber substantially entirely, except for interstices between the bodies. Heat storage bodies 26 of the bed rest against the array 32 and against a wall of the housing 18 which defines an opposite end of the bed.

Preferably, the heat storage bodies 26 provided in the chamber 19 adjacent to the array 32 are larger than the heat storage bodies disposed further along the chamber. The heat storage bed may comprise heat storage bodies of two or more different sizes, those of the larger size being generally near to the array 32 and those of the smaller size being spaced from the array. Alternatively, there may be heat storage bodies of a large number of different sizes, the average size in a region adjacent to the array 32 being larger than the average size in a region spaced from the array.

The array 32 defines one end of the bed which is composed of the bodies 26. Since the bodies, at least adjacent to the array 32, are quite large, the interstices defined by the array can also be quite large. Accordingly, the array does not cause a significant pressure drop in gases flowing through the array. Furthermore, the array is robust and is not prone to blockage by accummulation of foreign matter within the interstices defined by the array.

Each of the heat storage bodies 26 has at least one dimension exceeding five millimeter. Preferably, the interstices defined by the array 32 are at least five millimeter across and the heat storage bodies are so large that they cannot pass through the interstices defined by the array. Mutually adjacent interstices defined by the array are separated by structural parts of the array and these parts have widths, measured in a direction between the two adjacent interstices, similar to the widths of the interstices measured in the same direction.

The thickness of the array 32 between a face of the array presented to the bed of heat storage bodies 26 and an opposite face of the array is in excess of ten millimeter, exceeds the largest dimension of the bodies 26, exceeds the largest dimension of each interstice defined by the array and exceeds the internal diameter of the fuel pipe 22 adjacent to the free-end thereof. The diameter of the chamber 19 where the radially inwardly facing surface of the annular block 34 meets the array 32 is no more than twenty five times the thickness of the array and may be no more than twice the thickness of the array.

The radially inwardly facing surface of the annular block 34 is of conical form, the smaller diameter being immediately adjacent to the array 32 and the larger diameter being spaced away from the array in a direction towards a rear end of the chamber 19 remote from the mixing position 23. The annulus 34 serves partly to support the weight of the heat storage bodies 26 and partly to prevent movement of the heat storage bodies from the chamber 19 in a direction towards the mixing position 23.

The peripheral boundary of the chamber 19 is defined by a refractory lining 27 inside the housing 18. A layer of this lining which is nearer to the axis 21 is preferably formed of a fibrous material. To reduce the risk of the fibrous material being compressed excessively by the load imposed by the refractory bodies 26, there is provided an inner tubular structure or hollow support 37 which defines the radially innermost boundary of the chamber 19 and is therefore surrounded by the mass of refractory bodies. The support 37 may be cylindrical and is preferably co-axial with the fuel pipe 22. The internal diameter of the support 37 is substantially greater, preferably a plurality of times greater, than the external diameter of the fuel pipe 22 so that there is between the fuel pipe and the support an annular space 38. The support 37 is impermeable to gases and, at least when the burner is operating in the fire mode, a flow of air may be directed along the annular space 38 towards the mixing position 23 to extract heat from the fuel pipe 22 and/or to reduce the flow of heat to that fuel pipe through the support 37.

The support 37 approches sufficiently closely to the array 32 to prevent refractory bodies 26 escaping from the chamber 19 in a direction towards the mixing position 23. It will be noted that there is at the centre of the array 32 an unobstructed space 39 having a width approximately equal to the outside diameter of the support 37. The fuel pipe 22, or a nozzle provided thereon, may extend through the space 39 to the mixing position, into, but not completely through this space, or may terminate at the side of the array 32 remote from the mixing position. It will be noted that the array 32 is separate from the support 37 and from the fuel pipe 22. The support 37 is preferably spaced from the array 32 in a direction along the axis 21. However, it would be within the scope of the invention for an end portion of the support 37 to extend into the space 39.

A pilot burner and associated fuel-supply line 40 extends along the annular space 38 and terminates at a position outside the fuel pipe 22 but just inside the tube 37. Adjacent to the pilot burner, there is provided a flame-detection device 41 and connection means connecting the flame-detection device with control means of the burners also extends along the annular space 38. Additional sensing and control devices can be accommodated in the space 38, at the inside of the hollow support 37.

The array 32 also serves as a flame stabilizer, in addition to the function of excluding the heat storage bodies 26 from the mixing position 23. When the burner is operating in the fire mode, combustion air flows through the chamber 19 towards the mixing position and leaves the bed of refractory bodies, partly through the annular gap between the support 37 and the array 32 and partly through interstices between parts of the array 32. These parts of the array promote turbulence in the airflow so that the flame is stabilized at the downstream side of the array 32. It will be noted that no flame stabilizer is provided in or on the fuel pipe 22. The flame stabilizing array 32 is spaced from the fuel pipe.

Flow of combustion air from the bed of heat storage bodies 26 through the annular gap between the support 37 and the array 32 promotes turbulence of the gas flow emerging from the fuel pipe 22 and mixing of that gas flow with the combustion air. If required, a helical or other vane may be fitted at the free-end of the fuel pipe 22 to further promote turbulence of the gas flow emerging from the fuel pipe. A nozzle may be provided as an alternative to a vane, for the same purpose.

The heat storage means 31 may be constructed and arranged in a known manner and comprises a further mass of refractory bodies in a thermally insulated container. The container is spaced somewhat from the burner 12 and is connected with the inlet 36 of the burner by a thermally insulated duct 42.

The structure of the burner 13 may be identical with that of the burner illustrated in FIGS. 2 and 3. The heat storage means 30 is connected with the burner 13 by a thermally insulated duct 43 and the heat storage means 30 may be identical with the heat storage means 31.

When hot products of combustion are flowing from the furnace chamber 10 through the burner 12 to the flue 14, the fuel flowpath through that burner is closed by the fuel supply means 15 and the products of combustion which enter the burner from the opening 20 pass through the array 32 into the chamber 19. The direction of flow into and through the bed of heat storage bodies is generally along the axis 21, rather than transverse to the axis. In the chamber 19, heat is transferred from the products of combustion to the heat storage mass so that the products of combustion are considerably cooler, when they flow from the chamber 19 into the duct 42, than when they flow into the chamber 19. The peripheral boundary of the chamber 19 is preferably tapered towards the inlet 36, to reduce the cross-sectional area of the airflow path in a direction from the array 32 towards the inlet, so that the velocity of the products of combustion does not fall unduly as the temperature falls. The arrangement is such that the velocity of the products of combustion in the chamber 19 is maintained at a sufficiently high value to achieve good heat transfer to the heat storage mass.

It will be noted that the fuel pipe 22 is shielded by the hollow support 37 from direct contact with the hot products of combustion flowing through the chamber 19 when products of combustion are discharged from the chamber 10 through the burner 12.

As shown in FIG. 2, the air inlet 36 is of tubular form and is arranged with its axis perpendicular to the axis 21. The air inlet protrudes somewhat into the chamber 19, but is spaced from the support 37. This arrangement of inlet contributes to the construction of a compact burner. Surprisingly, although the flow of combustion air through the inlet 36 enters the chamber 19 at one side only of the axis 21, we have found that there is a good distribution of airflow throughout the bed of refractory bodies 26. Similarly, when products of combustion flow through the chamber 19 and leave the burner through the air inlet 36, the flow is well distributed throughout the bed of refractory bodies.

Alternatively, the air inlet 36 may extend through the circumferential wall of the chamber 19 and through the lining but merge smoothly with the surface of the lining which is nearest to the axis 21 so that the air inlet does not lie significantly nearer to that axis than is the lining. The end portion of the air inlet nearer to the axis may be outwardly flared, to promote distribution of the flow throughout the chamber. The air inlet, as viewed in a direction towards the axis 21 may be circular, square or otherwise rectangular. A layer of expanded metal may be present around the circumference of the bed of heat storage bodies 26. Such a layer distributes over the lining pressure exerted by the bodies 26 and prevents those bodies leaving the chamber through the air inlet, during transport of the burner to the place of use.

The products of combustion flow from the burner 12 through the duct 42 to the heat storage means 31, where the products of combustion are further cooled and the heat extracted from the products of combustion is stored in the heat storage bodies. Of the total heat stored in the heat storage bodies in the burner 12 and in the heat storage means 31 the proportion which is stored in the burner is preferably at least one tenth and more preferably exceeds one fifth and is typically one half.

When air and fuel are being supplied through the burner 12, fuel flows from the fuel supply means 15 along the fuel pipe 22 and is discharged from that pipe at the mixing position 23, which is disposed within the housing 18. Air at approximately ambient temperature is supplied through the heat storage means 31 to the chamber 19 of the burner, being heated in the heat storage means and further heated in the chamber 19 so that the temperature of the air discharged from the chamber 19 through the array 32 to the mixing position 23 is fairly high, initially being within about 200° C. of the temperature at which products of combustion leave the chamber 10. It will be understood that the temperature of the air discharged at the mixing position falls as the cycle proceeds and heat is extracted from the heat storage bodies.

If foreign matter accummulates on the heat storage bodies 26 in the burner, it will be necessary to clean or replace these heat storage bodies. For this purpose, the burner may be constructed to permit removal of the heat storage bodies from the burner whilst the burner remains mounted on the furnace wall 11. Alternatively, the burner may be demounted and the bodies removed from the chamber 10 at the end thereof which is adjacent to the mixing position. It will be noted that foreign matter will accummulate on the heat storage bodies in the burner, rather than on heat storage bodies in the heat storage means 31 and that cleaning or replacement of all of the heat storage bodies provided will not generally be necessary.

The apparatus illustrated in the accompanying drawing may be modified by omission of the heat storage means 30, the duct 43, the heat storage means 31 and the duct 42. In this case, the heat storage means is contained entirely within the burners and only parts of the furnace and parts of the burners are exposed to high temperatures. In this modified version of the apparatus, there are no ducts, valves or joints outside the burners which are subjected to temperatures similar to those attained in the furnace chamber 10.

The period occupied by a complete cycle of operation, that is operation of each burner in the fire mode and in the flue mode, is preferably at least 30 seconds. More preferably, the period during which fuel is supplied continuously to one of the burners when that burner is operating in the fire mode is at least 30 seconds so that a complete cycle will occupy a period in excess of one minute.

I claim:

1. A burner operable in fire and flue modes and comprising a housing having an interior and an opening which is an air inlet opening when the burner is operating in the fire mode, an inner tubular structure extending within the interior of the housing and including therein a fuel supply duct for supplying a fluent fuel to a mixing position adjacent to a downstream end of the fuel supply duct, a gas permeable, annular regenerative bed disposed in the housing in communication with said inlet opening and surrounding said inner tubular structure, an outer tubular structure surrounding the bed, bed-retaining means for defining a first end of the bed remote from the mixing position and further bed-retaining means for defining a second end of the bed nearer to the mixing position, wherein the bed is composed of a plurality of discrete randomly oriented elements, each of which elements is small in all directions compared with the bed, wherein said inner tubular structure includes an impermeable wall, said discrete elements of the bed rest against said wall throughout substantially the entire length of the bed from the first end thereof to the second end and wherein said further bed-retaining means for defining the second end of the bed is a gas permeable bed retaining means to permit flow of products of combustion through the bed generally in a first longitudinal direction away from the mixing position during operation of the burner in the flue mode and to permit combustion air to flow through the bed generally in a longitudinal direction opposite the first direction toward the mixing position during operation of the burner in the fire mode.

2. A burner according to claim 1 wherein the thickness of said further bed retaining means, measured in a direction from the bed to the mixing position, exceeds one centimeter.

3. A burner according to claim 1 wherein an outer wall of said tubular structure terminates at a position in the bed and spaced from said further bed retaining means.

4. A burner according to claim 1 wherein the fuel supply duct terminates at a position spaced from said further bed retaining means in a direction generally towards the first end of the bed.

5. A burner according to claim 1 further comprising an annular retaining wall which has a frusto-conical surface facing towards the bed with a small diameter end adjacent to said further retaining means and a large diameter end spaced from said further bed-retaining means in a direction toward the first end of the bed, said surface supporting a portion of the bed in contact therewith.

6. A burner according to claim 1 wherein the mixing position is immediately adjacent to said gas permeable further bed retaining means.

7. A burner according to claim 1 wherein the bed comprises a number of heat storage bodies and wherein heat storage bodies disposed near to the mixing position are larger than heat storage bodies disposed further from the mixing position.

8. A burner operable in fire and flue modes and comprising a housing having an interior and an opening which is an air inlet opening when the burner is operating in the fire mode, an inner tubular structure extending within the interior of the housing and including a fuel supply duct for supplying a fluent fuel to a mixing position adjacent to a downstream end of the fuel supply duct, a gas permeable, annular regenerative bed disposed in the housing in communication with said inlet opening and surrounding said inner tubular structure, bed-retaining means for defining a first end of the bed remote from the mixing position and further bed-retaining means for defining a second end of the bed nearer to the mixing position, wherein the bed is composed of a plurality of randomly oriented discrete elements, each of which elements is small in all directions compared with the bed, wherein said inner tubular structure includes an impermeable outer wall, the bed rests on said wall throughout substantially the entire length of the bed from the first end thereof to the second end, wherein said further bed-retaining means for defining the second end of the bed is a gas permeable bed retaining means disposed between the bed and the mixing position to permit flow of products of combustion into the bed generally in a direction extending along said wall during operation of the burner in the flue mode and to permit combustion air to flow from the bed generally in the opposite direction longitudinally of said wall to the mixing position during operation of the burner in the fire mode, wherein the mixing position is immediately adjacent to said gas permeable, further bed-retaining means and wherein said gas permeable, further bed retaining means comprises a plurality of elongated ceramic elements defining between them gaps through which the air leaves the bed, when the burner is operating in the fire mode.

9. A burner operable in fire and flue modes and comprising a housing defining an opening which is an air inlet opening when the burner is operating in the fire mode, an inner tubular structure extending within the interior of the housing and having disposed therein a fuel supply duct for supplying a fluent fuel to a mixing position adjacent to a downstream end of the fuel supply duct, a gas permeable, annular regenerative bed of a plurality of discrete randomly oriented heat storage bodies disposed in the housing and communicating with said inlet opening and surrounding said inner tubular structure, means defining a first end of the bed remote from the mixing position, means defining an airflow path from said inlet opening through the bed to the mixing position and a flame stabilizer separate from the inner tubular structure disposed at the mixing position for causing turbulent flow of the air and the fuel at the mixing position, wherein the flame stabilizer defines a second end of the bed adjacent to the mixing position and excludes the bed from the mixing position.

10. A burner according to claim 9 wherein the flame stabilizer is an annular structure and there is defined between the flame stabilizer and said tubular structure an annular gap which is too small for heat storage bodies of the bed to pass through the gap.

11. A burner according to claim 9 wherein the flame stabilizer comprises a plurality of elongated ceramic elements defining between them gaps through which air leaves the chamber when the burner is operating in the fire mode.

12. A burner according to claim 9 wherein heat storage bodies disposed near to the mixing position are larger than heat storage bodies disposed further from the mixing position.

13. A burner according to claim 9 wherein said inner tubular structure surrounds and is spaced from the fuel supply duct and wherein the bed rests partly on said inner tubular structure.

14. A burner according to claim 13 further comprising means for supplying air to the mixing position through said tubular structure.

15. A burner operable in fire and flue modes and comprising a housing having an interior and an opening which is an air inlet opening when the burner is operating in the fire mode, an inner tubular structure extending within the interior of the housing and including therein a fuel supply duct for supplying a fluent fuel to a mixing position adjacent to a downstream end of the fuel supply duct, a gas-permeable, annular regenerative bed of a plurality of discrete randomly oriented elements disposed in the housing and communicating with said inlet opening and surrounding said inner tubular structure, bed-retaining means defining a first end of the bed remote from the mixing position, an air flow path from said inlet opening longitudinally through the bed to the mixing position, a flame stabilizer disposed at the mixing position for causing turbulent flow of the air and the fuel at the mixing position and an annular retaining wall which has a frusto-conical inner surface facing toward the bed and supporting the portion of the bed in contact therewith with the smaller diameter end of the frusto-conical surface being adjacent to the flame stabilizer and the larger diameter and being spaced from the flame stabilizer in a direction towards the first end of the bed, wherein the flame stabilizer defines a second end of the bed adjacent to the mixing position and constitutes a bed-retaining means for excluding said discrete elements of the bed from the mixing position.

16. A burner operable in fire and flue modes and comprising a housing having an interior and an opening which is an air inlet opening when the burner is operating in the fire mode, an inner tubular structure extending the interior of the housing and including therein a fuel supply duct for supplying a fluent fuel to a mixing position adjacent to a downstream end of the fuel supply duct, a gas permeable, annular regenerative bed disposed in the housing in communication with said inlet opening and surrounding said inner tubular structure, bed-retaining means for defining a first end of the bed remote from the mixing position and further bed-retaining means for defining a second end of the bed nearer to the mixing position, wherein the bed is composed of a plurality of discrete randomly oriented elements, each of which elements is small in all directions compared with the bed, wherein said inner tubular structure includes an impermeable wall, said discrete elements of the bed rest against said wall throughout substantially the entire length of the bed from the first end thereof to the second end, wherein said further bed-retaining means for defining the second end of the bed is a gas permeable bed retaining means to permit flow of products of combustion through the bed generally in a longitudinal direction away from the mixing position during operation of the burner in the flue mode and to permit combustion air to flow through the bed generally in a first longitudinal direction opposite the first direction toward the mixing position during operation of the burner in the fire mode, and wherein there is at the center of the gas permeable, further bed-retaining means a space which forms a further part of the fuel flow path and wherein said tubular structure and said further bed-retaining means are arranged collectively to exclude from said space discrete elements of the bed.

* * * * *